(12) United States Patent
Mori et al.

(10) Patent No.: US 8,395,108 B2
(45) Date of Patent: Mar. 12, 2013

(54) PHOTOELECTRIC ENCODER INCLUDING DETECTION HEAD AND A PLURALITY OF FIBERS WITHIN A FIRST AND SECOND CABLE

(75) Inventors: Hiroatsu Mori, Kawasaki (JP); Hiroaki Kawada, Yokohama (JP)

(73) Assignee: Mitutoyo Corporation, Kawasaki (JP)

( * ) Notice: Subject to any disclaimer, the term of this patent is extended or adjusted under 35 U.S.C. 154(b) by 365 days.

(21) Appl. No.: 12/850,197

(22) Filed: Aug. 4, 2010

(65) Prior Publication Data

US 2011/0031382 A1 Feb. 10, 2011

(30) Foreign Application Priority Data

Aug. 4, 2009 (JP) ................................. 2009-181369

(51) Int. Cl.
*G01B 9/10* (2006.01)
*G02B 6/36* (2006.01)
(52) U.S. Cl. .................... 250/227.28; 385/92
(58) Field of Classification Search ............. 250/227.11, 250/227.14, 227.2, 227.21, 227.24, 227.26, 250/227.28, 237 R, 231.1–231.18, 216, 237 G, 250/239; 341/11, 13; 356/499, 496, 616, 356/617, 619, 622, 620, 600; 33/1 M, 1 L, 33/1 PT; 385/37, 54, 66, 88, 92, 109, 110, 385/102, 105, 116, 147
See application file for complete search history.

(56) References Cited

U.S. PATENT DOCUMENTS

| | | | | |
|---|---|---|---|---|
| 3,050,907 A | * | 8/1962 | Hicks, Jr. et al. | 65/24 |
| 3,955,878 A | * | 5/1976 | Nowak | 385/111 |
| 4,874,371 A | * | 10/1989 | Comben et al. | 604/95.01 |
| 4,967,745 A | * | 11/1990 | Hayes et al. | 606/7 |
| 6,905,258 B2 | * | 6/2005 | Tobiason et al. | 385/89 |
| 6,906,315 B2 | | 6/2005 | Tobiason | |
| 7,217,041 B2 | * | 5/2007 | Tobiason et al. | 385/89 |
| 2007/0071390 A1 | | 3/2007 | Tobiason et al. | |
| 2007/0156019 A1 | * | 7/2007 | Larkin et al. | 600/104 |

FOREIGN PATENT DOCUMENTS

| | | |
|---|---|---|
| EP | 1382941 A1 | 1/2004 |
| JP | 2004-053605 | 2/2004 |
| JP | 2007-232681 | 9/2007 |
| JP | 2008-039602 | 2/2008 |

OTHER PUBLICATIONS

European Office Communication, Applicant—Mitutoyo Corporation, for Application No. 10171338.6, dated Oct. 15, 2012, 4 pages.

* cited by examiner

*Primary Examiner* — Que T Le
*Assistant Examiner* — Jennifer Bennett
(74) *Attorney, Agent, or Firm* — Rankin, Hill & Clark LLP

(57) ABSTRACT

A photoelectric encoder includes: a scale; a detection head; fibers through which light that is to be irradiated on the scale and light reflected by the scale propagates; first and second cables each having a space in which the fibers are partially disposed; and a case that encloses a light source that supplies light to one of the fibers and a light-sensitive element that receives the reflected light propagating through the others of the fibers and converts the received light into an electric signal. The first cable, the second cable, and the case are disposed in this order in the direction of propagation of the reflected light. The positions of the fibers are fixed relative to one another inside the first cable in the direction orthogonal to the direction of length of the fibers and variable relative to one another inside the second cable in the orthogonal direction.

14 Claims, 8 Drawing Sheets

FIG. 8
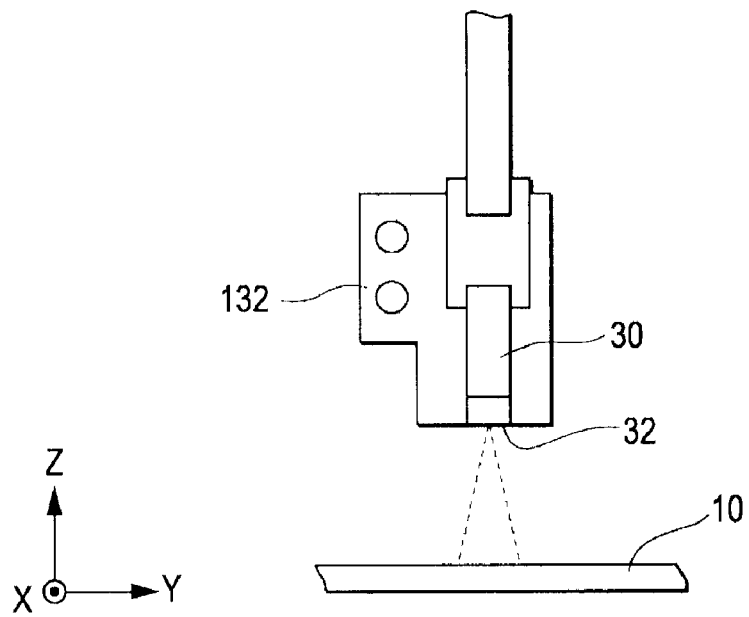
FIG. 9
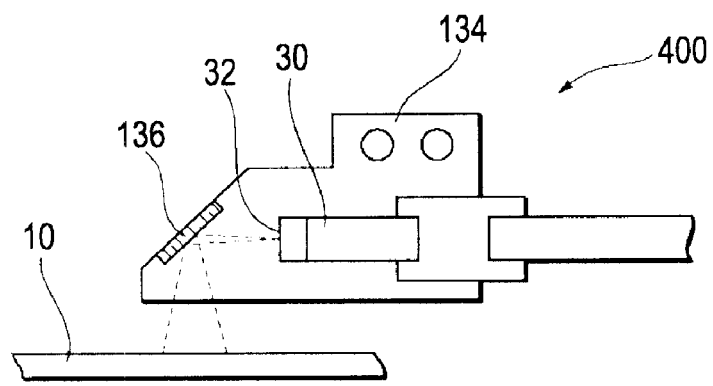
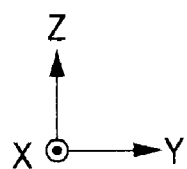

PHOTOELECTRIC ENCODER INCLUDING DETECTION HEAD AND A PLURALITY OF FIBERS WITHIN A FIRST AND SECOND CABLE

TECHNICAL FIELD

The present invention relates to a photoelectric encoder.

BACKGROUND

A photoelectric encoder generally uses a bundle fiber, which is a bundle of fibers fixed to one another. A photoelectric encoder of related art includes a scale, a light emission fiber, a plurality of light reception fibers, and a detection head. The scale has a diffraction grating formed at a predetermined pitch in the direction of the measurement axis. The detection head, which can change its relative position with respect to the scale, irradiates the scale with coherent light. Light reflected by the scale enters the detection head. The outgoing coherent light propagates through the light emission fiber. The incoming reflected light propagates through the light reception fibers. The light emission fiber is disposed at the center on a detection plane of the detection head. The light reception fibers are disposed around the light emission fiber on the detection plane. The system of related art further includes and an interface unit that includes a light source, a light-sensitive element, and a signal processing unit. The light source supplies a laser beam to the light emission fiber in the detection head. The light-sensitive element receives the reflected light propagating through the light reception fibers and converts the received light into an electric signal. The signal processing unit processes the signal to measure a relative positional shift due to the movement of the detection head, the scale, or both. Examples of the related art are disclosed in the following Japanese Unexamined Patent Application Publications: Nos. 2004-53605, 2008-39602, and 2007-232681.

However, to carry out remote measurement by using such a photoelectric encoder of related art with a certain distance between the detection head and the interface (e.g., 20 m or longer), it is necessary to extend the plurality of fibers. Therefore, it is necessary to manufacture a long bundle fiber, which is not easy. It is hard to say that a photoelectric encoder of related art offers easiness in handling, usability, and work efficiency satisfactorily. Moreover, in the photoelectric encoder of related art, it is necessary to insert the bundle fiber into the interface and branch the plurality of fibers into the light emission fiber and the light reception fibers. Such a structure requires components that are used for unbundling the bundle fiber inside the interface. Thus, the reduction in the size of the interface is limited.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An advantage of some aspects of the invention is to provide a photoelectric encoder that can solve the above problems, though not limited thereto. A combination of constituent elements and/or features that are recited in an independent claim appended hereto offers such an advantage. Preferred modes are recited in dependent claims appended hereto.

A photoelectric encoder according to an aspect of the invention includes a scale, a detection head, a plurality of fibers, first and second cables, and a frame unit. The scale has a diffraction grating formed at a predetermined pitch in a measurement axis direction. The detection head irradiates the scale with light and receives light reflected by the scale. The light that is to be irradiated on the scale and the light reflected by the scale propagates through the plurality of fibers. Each of the first and second cables has an inner space in which the plurality of fibers is partially disposed. A light source and a light-sensitive element are provided inside the frame unit. The light source supplies light to the plurality of fibers or at least one of the plurality of fibers. The light-sensitive element receives the reflected light propagating through the plurality of fibers or the others of the plurality of fibers and converts the received light into an electric signal. The first cable, the second cable, and the frame unit are disposed in this order in a direction of propagation of the light reflected by the scale through the plurality of fibers or the others of the plurality of fibers. The plurality of fibers is partially disposed in the inner space of the first cable in such a manner that the positions of the fibers are fixed relative to one another in a direction orthogonal to a direction of length of the fibers. The plurality of fibers is partially disposed in the inner space of the second cable in such a manner that the positions of the fibers are variable relative to one another in the direction orthogonal to the direction of the length of the fibers.

In a photoelectric encoder according to the above aspect of the invention, the plurality of fibers is partially disposed in the inner space of the first cable in such a manner that the positions of the fibers are fixed relative to one another in a section taken along a plane orthogonal to the direction of the length of the fibers. In addition, the plurality of fibers is partially disposed in the inner space of the second cable in such a manner that the positions of the fibers are variable relative to one another in the section taken along the plane orthogonal to the direction of the length of the fibers. Since such a structure reduces or eliminates need for fixing the fibers for a long distance, which is cumbersome, it is possible to assemble the photoelectric encoder easily. In addition, with such a structure, it is easier to configure a system for long distance optical transmission through the fibers. Moreover, since the plurality of fibers is partially disposed in the inner space of the second cable, which is relatively near the frame unit, in such a manner that the positions of the fibers are variable relative to one another in the section taken along the orthogonal plane, it is easier to optically connect the fibers to the light source and the light-sensitive element, which are provided inside the frame unit. Furthermore, since the plurality of fibers is partially disposed in the inner space of the second cable, which is provided outside the frame unit, in such a manner that the positions of the fibers are variable relative to one another in the section taken along the orthogonal plane, it is not necessary to provide components that are used for unbundling a bundle fiber inside the frame unit. Thus, the size of the frame unit can be reduced. Thus, it is possible to provide a photoelectric encoder that can improve easiness in handling, usability, and work efficiency.

In the above photoelectric encoder, the plurality of fibers may be partially disposed in the inner space of the second cable in such a manner that positions of the fibers are random relative to one another in the direction orthogonal to the direction of the length of the fibers.

In the above photoelectric encoder, the plurality of fibers may be partially disposed in the inner space of the second cable in such a manner that each of the fibers has slack.

In the above photoelectric encoder, the plurality of fibers may be partially disposed in the inner space of the first cable in such a manner that each two of the fibers one of which is disposed adjacent to the other in the direction orthogonal to the direction of the length of the fibers are in contact with each other.

In the above photoelectric encoder, an inside diameter of the second cable may be larger than an inside diameter of the first cable.

In the above photoelectric encoder, the second cable may be more flexible than the first cable.

In the above photoelectric encoder, the second cable may have a first connector provided at one end in the direction of the length of the fibers and a second connector provided at the other end in the direction of the length of the fibers.

In the above photoelectric encoder, the first cable may have a connector that can be coupled to the first connector, and the frame unit may have a connector that can be coupled to the second connector.

In the above photoelectric encoder, the second cable may include a plurality of cable pieces; each of the cable pieces may have the first connector and the second connector; the first connector can be coupled to the second connector; and the first connector of one cable piece of the second cable may be coupled to the second connector of another cable piece of the second cable.

In the above photoelectric encoder, the plurality of fibers may include a light emission fiber through which the light that is to be irradiated on the scale propagates and a plurality of light reception fibers through which the light reflected by the scale propagates.

The above photoelectric encoder may include a third cable that is provided between the second cable and the frame unit and has an inner space in which the light emission fiber is disposed and a fourth cable that is also provided between the second cable and the frame unit and has an inner space in which the plurality of light reception fibers is disposed.

The above photoelectric encoder may further include an optical element that changes a direction of the light that is emitted from the detection head for irradiation on the scale and changes a direction of the light reflected by the scale, wherein a position of the optical element relative to a position of the detection head is fixed.

To the accomplishment of the foregoing and related ends, the invention, then, involves the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 8 is a diagram that schematically illustrates an example of the configuration of a photoelectric encoder according to a variation example of the embodiment of the invention; and FIG. 9 is a diagram that schematically illustrates an example of the configuration of a photoelectric encoder according to a variation example of the embodiment of the invention.

DETAILED DESCRIPTION

With reference to the accompanying drawings, an exemplary embodiment of the present invention will now be explained in detail. The specific embodiment described below is not intended to limit the scope of the invention recited in the appended claims. Nor is it always necessary to combine all of features described below to provide a means for solving problems including the problems explicitly shown herein.

A photoelectric encoder according to an exemplary embodiment of the invention is explained below while referring to FIGS. 1 to 5.

Figure 1:
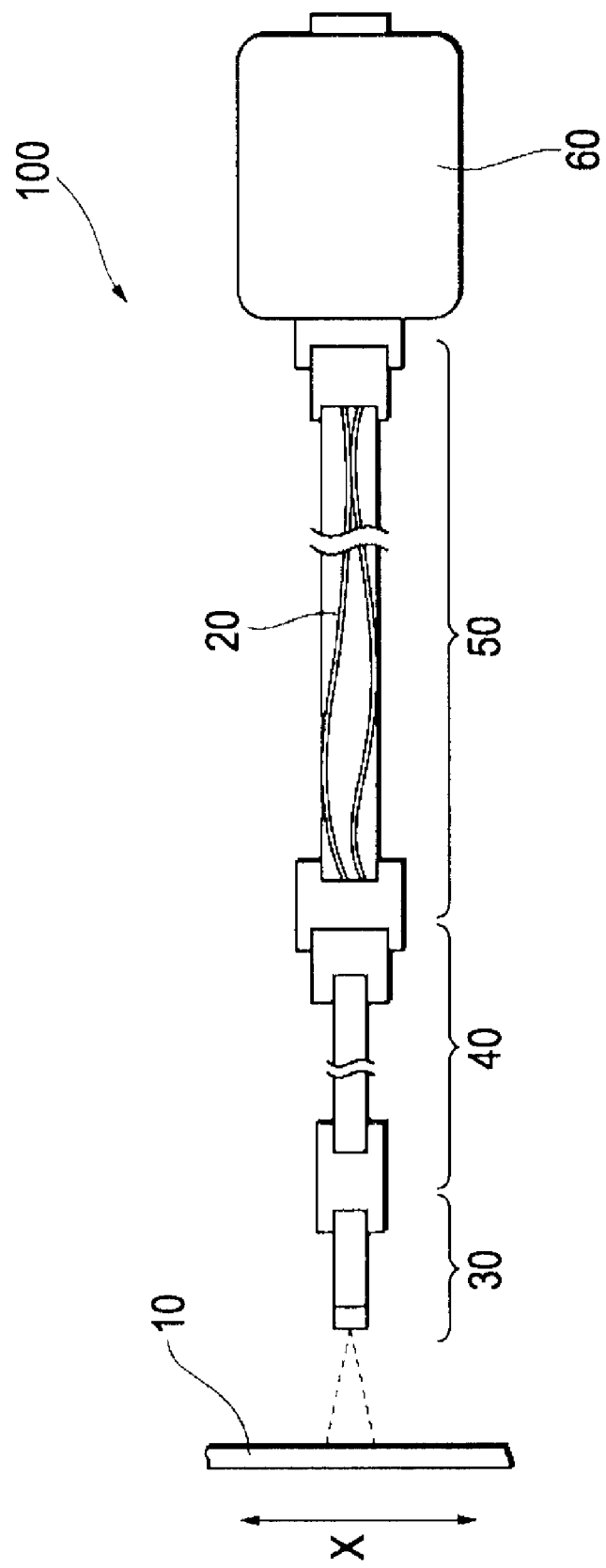
FIG. 1 is a diagram that schematically illustrates an example of the configuration of a photoelectric encoder according to an exemplary embodiment of the invention.

FIG. 1 is a diagram that schematically illustrates an example of the configuration of a photoelectric encoder according to an exemplary embodiment of the invention. Each of FIGS. 2 to 5 is a detailed view of the photoelectric encoder illustrated in FIG. 1. A photoelectric encoder 100 includes a scale 10, a plurality of fibers 20, a detection head 30, a first cable 40, a second cable 50, and a case 60. A diffraction grating is formed on the scale 10 at a predetermined pitch in the direction of the measurement axis. The detection head 30 irradiates the scale 10 with light. The light is reflected at the scale 10. The detection head 30 receives the reflected light. Light that is to be emitted from the detection head 30 toward the scale 10 propagates through the fiber 20. The reflected light, which comes from the scale 10 and then enters the detection head 30, propagates through the fibers 20. Each of the first cable 40 and the second cable 50 has an inner space in which the fibers 20 are partially disposed. A light source 62 and a light-sensitive element (elements) 64 are provided inside the case 60. The light source 62 supplies light to the fiber 20. The light-sensitive element 64 receives the reflected light propagating through the fibers 20 and converts the received light into an electric signal. The photoelectric encoder 100 is, for example, a linear encoder.

As illustrated in FIG. 1, the direction of the length of the scale 10 is the direction of the measurement axis, which is denoted as X. The detection head 30 is configured to be able to change its relative position with respect to the scale 10 in the X direction while keeping a predetermined fixed distance from the scale 10. The detection head 30 may be configured as a fixed head. In such a configuration, the scale 10 moves to change the relative position of the detection head 30 with respect to the scale 10. Alternatively, the scale 10 may be configured as a fixed scale. In such a configuration, the detection head 30 moves to change the relative position of the detection head 30 with respect to the scale 10. As another configuration example, both the detection head 30 and the scale 10 may move to change the relative position of the detection head 30 with respect to the scale 10.

Figure 2:
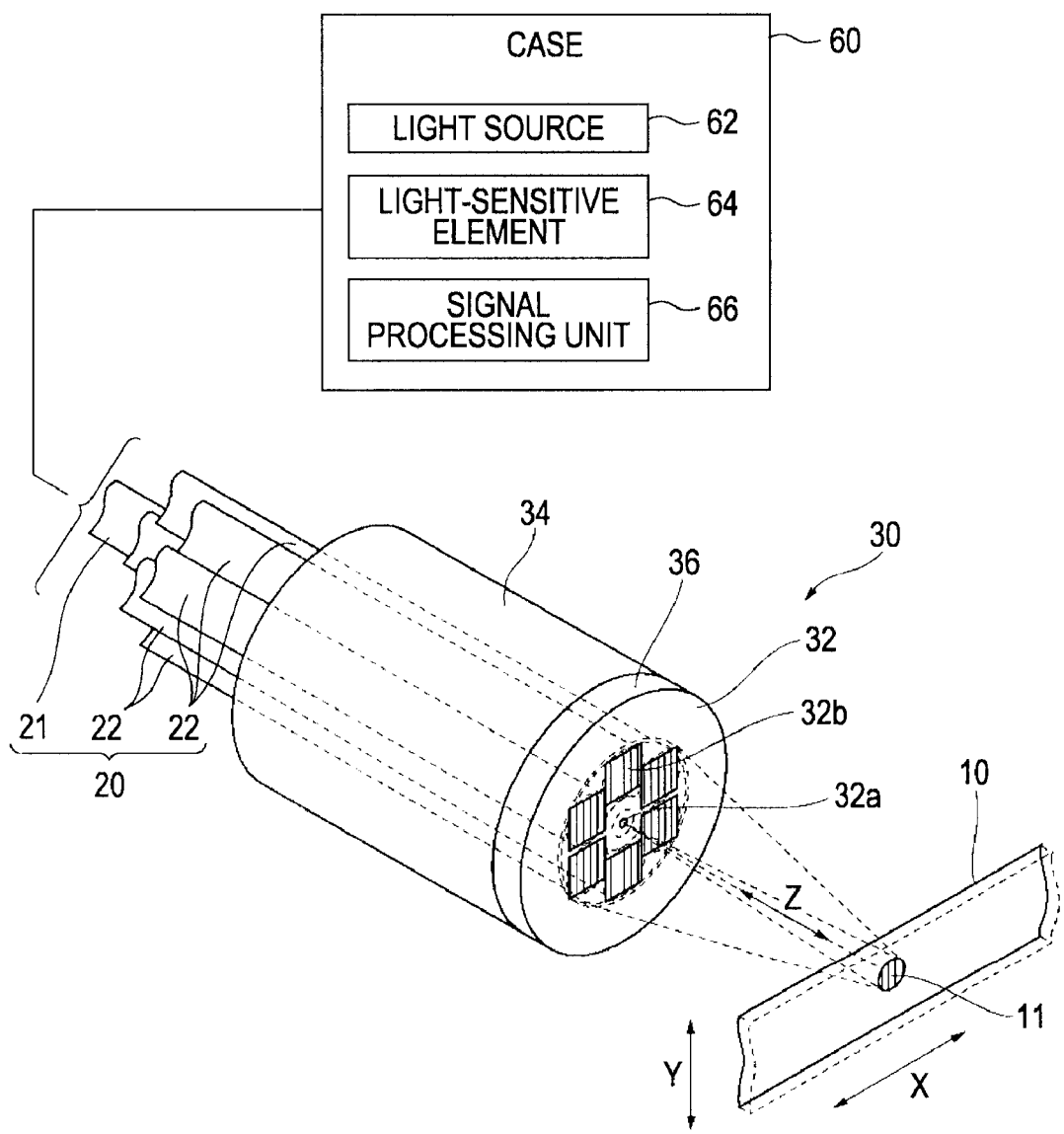
FIG. 2 is a detailed view of the photoelectric encoder illustrated in FIG. 1.

As illustrated in FIG. 2, a diffraction grating 11 is formed on the scale 10. The diffraction grating 11 has a periodic array structure at a predetermined pitch in the X direction with a linear pattern extending in the Y direction. The array pitch of the diffraction grating 11 is determined on the basis of its relation to the wavelength of a light source to ensure that zero-order diffracted light is attenuated in the X direction on the detection plane of the detection head 30 to produce Gaussian distribution having two bell-shaped curves by first-order diffracted light. As for the Y direction, for example, the diffraction grating 11 reflects light to produce Gaussian distribution having one bell-shaped curve.

Figure 3:
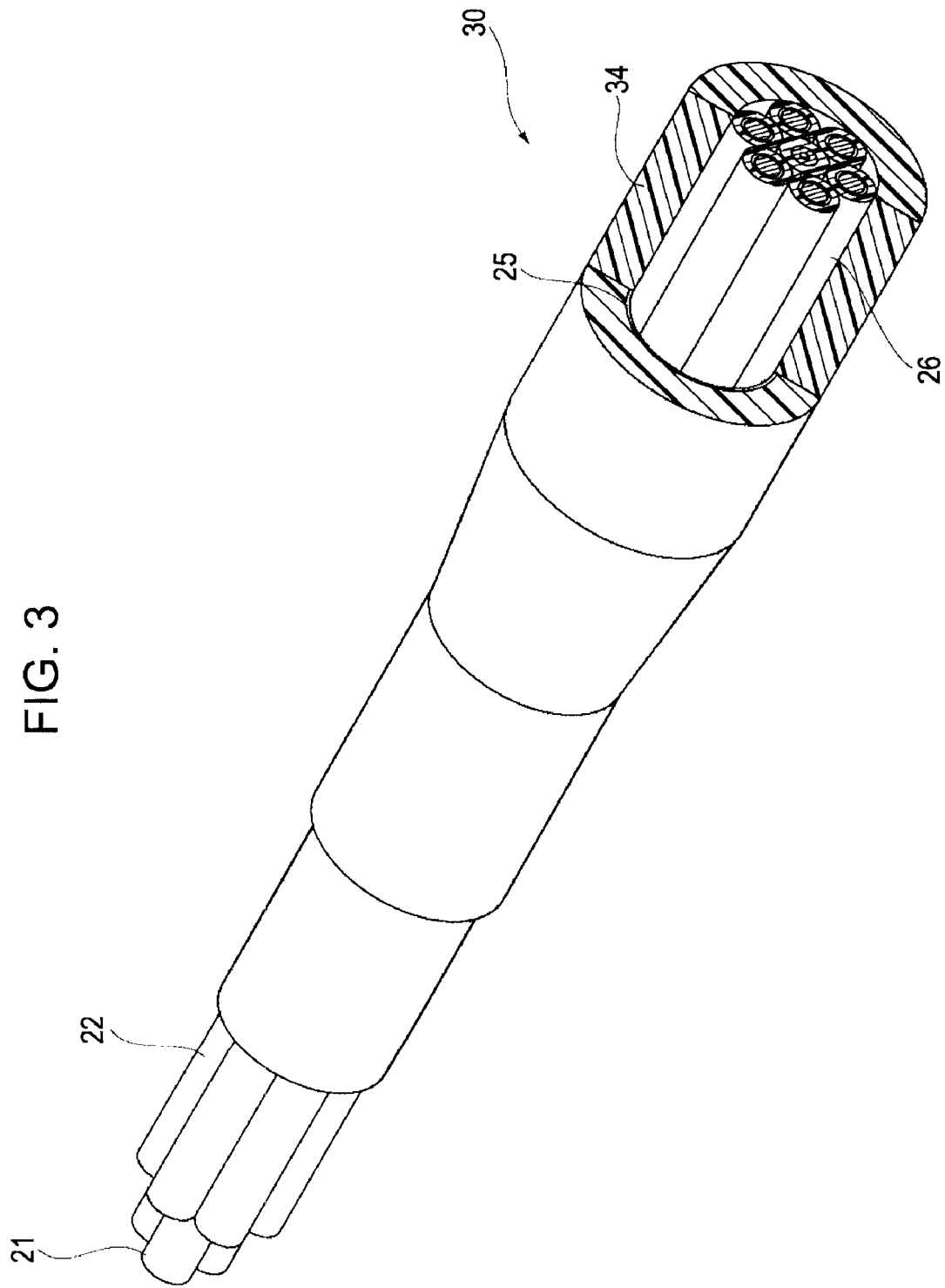
FIG. 3 is a detailed view of the photoelectric encoder illustrated in FIG. 1.
Figure 4:
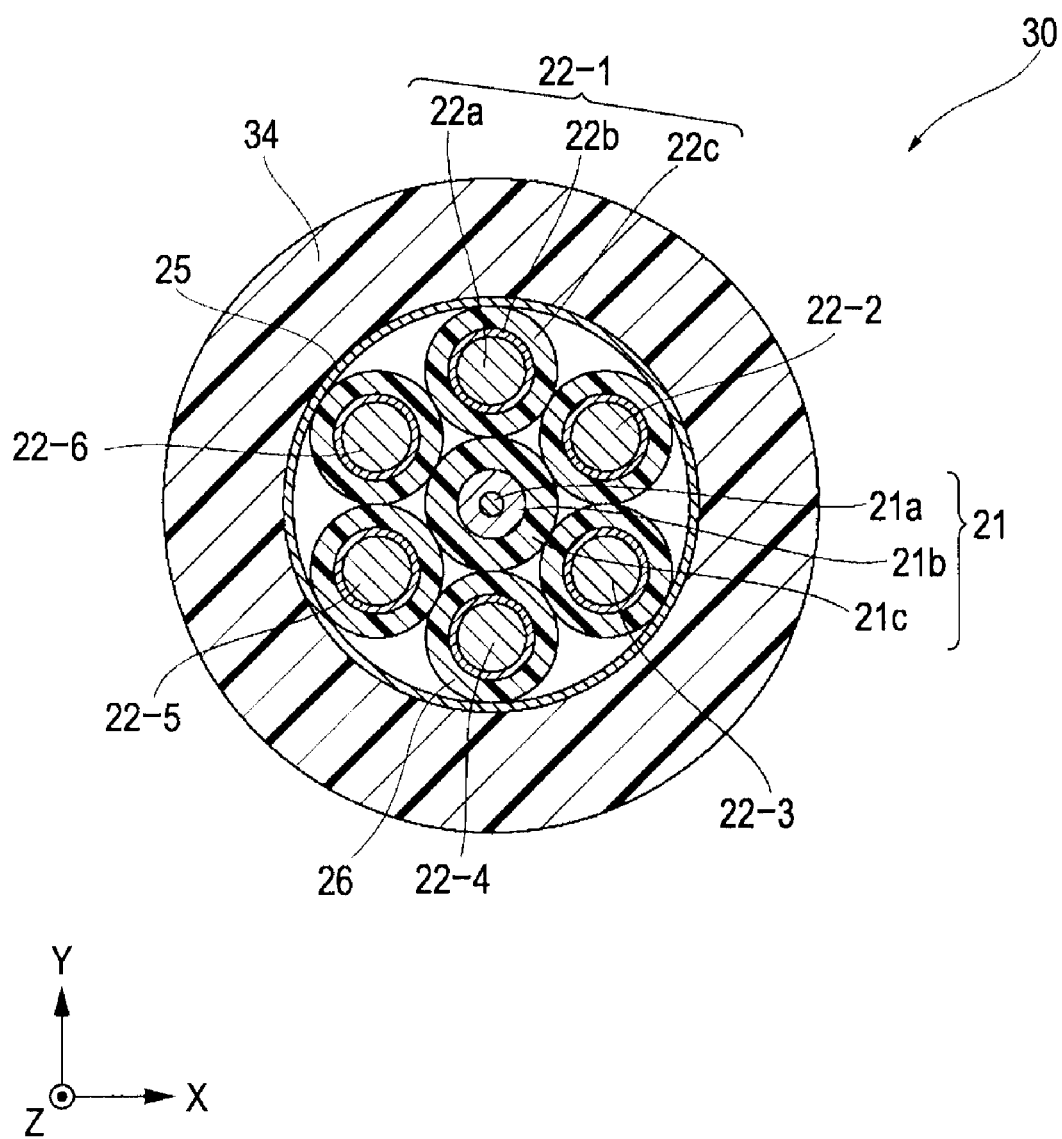
FIG. 4 is a detailed view of the photoelectric encoder illustrated in FIG. 1.

Next, with reference to FIGS. 2, 3, and 4, the structure of the plurality of fibers 20 and the detection head 30 is explained in detail. FIG. 2 is a perspective view that schematically illustrates an example of components including the detection head 30. FIG. 3 is a partial perspective view that schematically illustrates an example of the structure of the detection head 30 shown in FIG. 2. FIG. 4 is a sectional view taken along a plane orthogonal to the direction of the length of the plurality of fibers 20.

As illustrated in FIG. 2, the detection head 30 has an optical surface 32. The detection head 30 emits light toward the scale 10 through the surface 32. The detection head 30 receives the reflected light, that is, light reflected by the scale 10, through the surface 32. Accordingly, the surface 32 of the detection head 30 functions as a light emission plane, a light reception plane, or combinations thereof. The detection head 30 includes a cylindrical ferrule 34 and a mask 36. The ferrule 34 is a member that encloses the end region of the plurality of fibers 20. The mask 36, which is made of, for example, glass, is disposed at said end of the fibers 20 and the front of the ferrule 34. In such a structure, it may be the mask 36 that has the optical surface 32 functioning as the light emission plane or the light reception plane. The mask 36 allows light that is to be emitted toward the scale 10 to pass therethrough. In addition, the mask 36 allows light reflected by the scale 10 to pass therethrough. The mask 36 has lattice-shaped slits 32b. The slits 32b are formed at positions corresponding to the positions of the fibers 20 through which the reflected light, which comes from the scale 10 and then enters the slits 32b, propagates. As may be necessary, a hole 32a may be formed through the mask 36 at a position corresponding to the position of the fiber 20 through which light that is to be emitted toward the scale 10 propagates. The mask 36 has a function of protecting the fibers 20. The mask 36 has another function of preventing the fibers 20 from protruding outside as a stopper. The outside diameter of the mask 36 in the X-Y plane shown in FIG. 2 may be substantially the same as that of the ferrule 34. Alternatively, the outside diameter of the mask 36 in the X-Y plane shown in FIG. 2 may be larger than that of the ferrule 34. In the latter structure, the mask 36 has a concave in which the ferrule 34 is fitted.

As illustrated in FIG. 2, the plurality of fibers 20 includes a light emission fiber 21 and a plurality of light reception fibers 22. The light emission fiber 21 is a fiber through which the outgoing light, which is to be emitted from the detection head 30 toward the scale 10, propagates. The light reception fiber 22 is a fiber through which the reflected light, which comes from the scale 10 and then enters the corresponding slit 32b, propagates. As illustrated in FIG. 3, the plurality of fibers 20 is, for example, cut and disposed in a bundle to an even length.

The end region of the plurality of fibers 20 is disposed inside the detection head 30. Specifically, the ferrule 34 encloses the end region of the plurality of fibers 20 as explained earlier.

As illustrated in FIG. 3, the plurality of fibers 20 is bundled inside an inner tube 25. The inside diameter of the inner tube 25 is slightly larger than the diameter of a virtual cylinder (i.e., circle in cross section) circumscribing the bundled fibers 20 (hereinafter referred to as "bundle diameter" (BD)). The ferrule 34 encloses the inner tube 25 inside which the fibers 20 are bundled. In one instance, the inner tube 25 is not larger than the bundle diameter multiplied by 0.15 (BD×0.15). In another instance, it may be approximately BD×0.2 because appressed decentration that occurs at the time of bundle insertion makes it still possible to prevent the fibers 20 from becoming displaced loosely.

The light emission fiber 21, that is, the fiber through which light that is to be emitted toward the scale 10 propagates, has a core 21a and a cladding 21b. As illustrated in FIG. 4, the core 21a is disposed at the center of the light emission fiber 21 in cross section. The core 21a is a part that guides light. As illustrated therein, the cladding 21b is formed around the core 21a. The index of refraction of the cladding 21b is lower than that of the core 21a. The light emission fiber 21 may further include a sheath 21c that is formed on the circumferential surface of the cladding 21b as a cover. For example, a single mode fiber is used as the light emission fiber 21.

The structure of each of the plurality of light reception fibers 22, that is, the fiber through which the light reflected by the scale 10 propagates, is similar to that of the light emission fiber 21. Specifically, the light reception fiber 22 has a core 22a and a cladding 22b. The core 22a, which is a part that guides light, is disposed at the center of the light reception fiber 22 in cross section. The cladding 22b is formed around the core 22a. The index of refraction of the cladding 22b is lower than that of the core 22a. The light reception fiber 22 may further include a sheath 22c that is formed on the circumferential surface of the cladding 22b as a cover. For example, a multi mode fiber is used as the light reception fiber 22.

The plurality of fibers 20 is partially housed in the detection head 30 in such a manner that the positions of the fibers 20 are fixed relative to one another in a section taken along a plane (i.e., X-Y plane in FIG. 4) orthogonal to the direction of the length (i.e., Z direction) of the fibers 20. In such a structure, it is preferable that relative positions of the fibers 20 should be fixed with respect to the detection head 30 in the X-Y plane orthogonal to the Z direction. The fibers 20 may be partially housed in the detection head 30 in such a manner that each two of the fibers 20 one of which is disposed adjacent to the other in the X-Y plane are in contact with each other.

In the illustrated example of FIG. 4, one light emission fiber 21 is disposed at the center of the ferrule 34 in the X-Y plane. Six light reception fibers 22-1 to 22-6 are disposed around the light emission fiber 21 in the X-Y plane. Specifically, the six light reception fibers 22-1 to 22-6 are disposed to form the shape of a regular hexagon in cross section. The light emission fiber 21 is disposed at the center of the regular hexagon. The positions of the six light reception fibers 22-1 to 22-6 have symmetry in cross section. That is, the light reception fibers 22-1 and 22-4 are disposed symmetrically with respect to the central axis of the light emission fiber 21. The light reception fibers 22-2 and 22-5 are disposed symmetrically with respect to the central axis of the light emission fiber 21. The light reception fibers 22-3 and 22-6 are disposed symmetrically with respect to the central axis of the light emission fiber 21.

As explained above, the plurality of fibers 20 is bundled in such a manner that the positions of the fibers 20 are fixed relative to one another in the X-Y plane orthogonal to the Z direction. In this specification, such a bundle of the fibers 20 are collectively referred to as "bundle fiber" with a reference numeral 26. The plurality of fibers 20 may be bonded to one another to form the bundle fiber 26. In one instance, it is preferable that the diameter of a virtual circle circumscribing the bundle fiber 26 should be roughly equal to the inside diameter of the ferrule 34 in cross section. With such a preferred structure, it is possible to fix the position of the bundle fiber 26 with respect to the detection head 30.

As illustrated in FIG. 1, each of the first cable 40 and the second cable 50 is a cable inside the jacket of which the plurality of fibers 20 is partially disposed. For example, each of the first cable 40 and the second cable 50 has a cylindrical or tubular shape. Each of the first cable 40 and the second cable 50 has an inner space through which the plurality of fibers 20 can be inserted. In the structure of the photoelectric encoder 100, the detection head 30, the first cable 40, the second cable 50, and the case 60 are disposed in the order of appearance herein in the direction of the propagation of the reflected light, that is, light reflected by the scale 10, through the plurality of fibers 20 (the plurality of light reception fibers 22). Other component member(s) may be interposed between any two of the detection head 30, the first cable 40, the second cable 50, and the case 60 as long as they are disposed in the sequential order described above. The detailed structure of the first cable 40 and the second cable 50 will be explained later while referring to FIG. 5.

Next, the case 60 is explained in detail below. As illustrated in FIG. 2, besides the light source 62 and the light-sensitive element 64, a signal processing unit 66 is housed in the case 60. The signal processing unit 66 processes an electric signal obtained through photoelectric conversion performed by the light-sensitive element 64. The case 60 is a unit that functions as an interface between the detection head 30 and a computer, which is not illustrated in the drawing. The computer operates on the basis of an electric signal that has been converted by the light-sensitive element 64 from light reflected by the scale 10 and then processed at the signal processing unit 66.

The light source 62 supplies coherent light for irradiation on the scale 10. For example, the light source 62 emits a beam of laser light such as a semiconductor laser beam, a gas laser beam, or the like. The light supplied from the light source 62 is guided through the core 21a of the light emission fiber 21. Having propagated through the core 21a, the light is emitted through the through hole 32a of the surface 32 of the mask 36 (detection head 30). The reflected light coming from the scale 10 propagates through the core 22a of each of the light reception fibers 22 to reach the light-sensitive element 64. An example of the light-sensitive element 64, which receives the reflected light propagating through the fibers 20 and converts the received light into the electric signal, is a charge-coupled device (CCD). On the basis of the electric signal, which has been converted by the light-sensitive element 64 from the reflected light received by the light-sensitive element 64, the signal processing unit 66 measures a relative positional shift in the measurement axis direction X when the detection head 30 changes its relative position with respect to the scale 10 due to the movement of the detection head 30, the scale 10, or both in the X direction.

As explained above, electric components that perform electric signal processing are housed in the case 60. The case 60 including the electric components is provided as a unit separated from the detection head 30 in which optical components are mounted. With such a structure, it is possible to avoid undesirable phenomena such as heat evolution, electrical noise generation, or the like that would occur if the electric components were mounted in the detection head 30. Therefore, it is possible to improve measurement accuracy. Moreover, since a photoelectric encoder has such a structure, it can be suitably used for, for example, an apparatus that requires positioning with ultra high precision or an apparatus that requires remote control in an atomic/nuclear power plant, a chemical plant, or the like.

Next, with reference to FIG. 5, the first cable 40 and the second cable 50 are explained in detail below. In the present embodiment of the invention, the plurality of fibers 20 is partially disposed inside the jacket of the first cable 40 in such a manner that the positions of the fibers 20 are fixed relative to one another in a section taken along a plane (i.e., X-Y plane) orthogonal to the direction of the length (i.e., Z direction) of the fibers 20. In addition, the plurality of fibers 20 is partially disposed inside the jacket of the second cable 50 in such a manner that the positions of the fibers 20 are variable relative to one another in the X-Y plane. It is noted that only a few of the plurality of fibers 20 are shown at a space inside the second cable 50 in FIG. 5 for the purpose of simplifying the illustration of the loose and unbundled state of the fibers 20 thereat. The same applies for FIGS. 1, 6, and 7.

The first cable 40 is connected to the detection head 30 by means of a coupling part 42. The plurality of fibers 20 extending from the detection head 30 is partially disposed inside the jacket of the first cable 40. Specifically, the part of the plurality of fibers 20 that extends from the detection head 30, that is, the bundle fiber 26, is disposed inside the jacket of the first cable 40 in such a manner that the positions of the fibers 20 are fixed relative to one another in the X-Y plane. The foregoing explanation of the cross-sectional structure of the part of the plurality of fibers 20 that is housed in the detection head 30, including the relative positions thereof, holds true for that of the part of the plurality of fibers 20 that is disposed inside the jacket of the first cable 40.

In one instance, the first cable 40 should preferably be less flexible than the second cable 50. For example, the first cable 40 may be made of a material that is harder than the material of the second cable 50. An example of the material of the first cable 40 is iron. With such a preferred structure, it is possible to avoid the bundle fiber 26 from being bent. Therefore, the bundle fiber 26 is protected from damage. In addition, it is possible to avoid the relative positions of the plurality of fibers 20 from becoming shifted due to bending.

Figure 5:
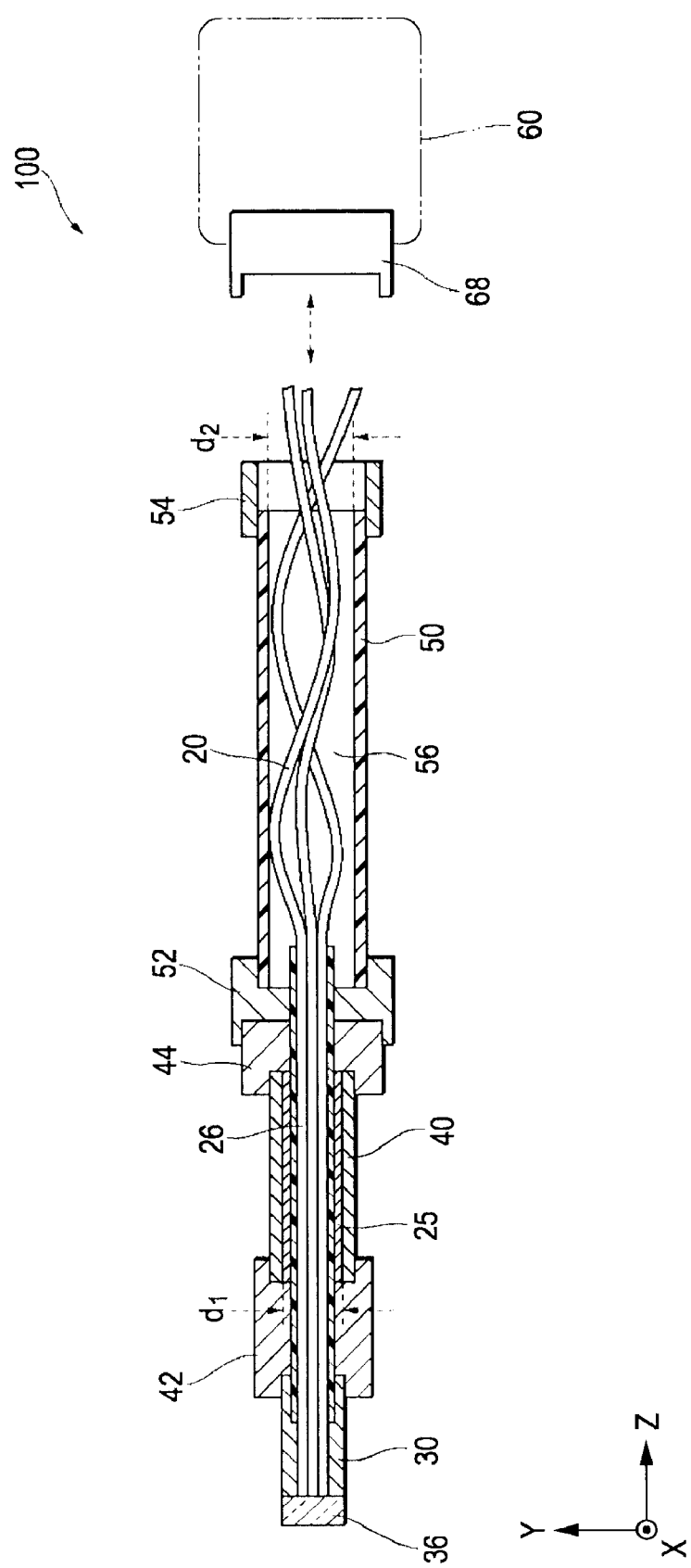
FIG. 5 is a detailed view of the photoelectric encoder illustrated in FIG. 1.

As illustrated in FIG. 5, the inside diameter d1 of the first cable 40 may be slightly larger than the outside diameter of the bundle fiber 26 so that a small clearance is formed between the bundle fiber 26 and the inner surface of the first cable 40. The position of the bundle fiber 26 may be variable in the X-Y plane because of such a clearance. In other words, the X-Y position of the bundle fiber 26 may be variable with respect to the first cable 40. Alternatively, the position of the bundle fiber 26 may be fixed in the X-Y plane inside the first cable 40. The bundle fiber 26 is covered with the inner tube 25 for protection inside the first cable 40.

The second cable 50 is connected to the first cable 40. The plurality of fibers 20 extending from (and through) the first cable 40 is partially disposed inside the jacket of the second cable 50. Specifically, the part of the plurality of fibers 20 that extends from the first cable 40 is disposed inside the jacket of the second cable 50 in such a manner that the positions of the fibers 20 are variable relative to one another in a section taken along a plane (i.e., X-Y plane) orthogonal to the direction of the length (i.e., Z direction) of the fibers 20. That is, at the part mentioned above, the fibers 20 are not bundled as the bundle fiber 26 inside the second cable 50. The unbundled part of the plurality of fibers 20 may be disposed inside the jacket of the second cable 50 in such a manner that the positions of the fibers 20 are random relative to one another in the X-Y plane. In addition, in one instance, it is preferable that the unbundled part of the plurality of fibers 20 should be disposed inside the jacket of the second cable 50 in such a manner that each of the fibers 20 has slack in it. In other words, it is preferable that the length of the unbundled part of the plurality of fibers 20 that is loosely disposed inside the jacket of the second cable 50 should be greater than the length of the second cable 50 from one end to the other end. With such a preferred structure, since each of the fibers 20 has slack in it, it is possible to relieve stress applied to the fibers 20 when the second cable 50 is bent. Each of the fibers 20 may be fixed at both of the ends of the second cable 50 inside the jacket thereof.

In one instance, the second cable 50 should preferably be more flexible than the first cable 40. For example, the second cable 50 may be made of a material that is softer than the material of the first cable 40. An example of the material of the second cable 50 is resin. With such a preferred structure, it is possible to significantly improve easiness in handling, usability, and work efficiency. Furthermore, since the unbundled part of the plurality of fibers 20 is disposed inside the jacket of the second cable 50 in such a manner that the positions of the fibers 20 are variable relative to one another in the X-Y plane, loose displacement of this part of the fibers 20 makes it possible to relieve stress applied to the fibers 20 when the second cable 50 is bent.

In addition, as illustrated in FIG. 5, in one instance, it is preferable that the inside diameter d2 of the second cable 50 should be larger than the inside diameter d1 of the first cable 40. With such a preferred structure, it is possible to prevent the second cable 50 from being bent at a sharp angle because the inside diameter d2 of the second cable 50 is comparatively large. Thus, it is possible to prevent the plurality of fibers 20 from being broken or damaged inside the second cable 50. As illustrated in FIG. 5 and understood from the above explanation, the plurality of fibers 20 is not covered with the inner tube 25 inside the second cable 50.

The second cable 50 has a connector 52 at one end in the direction of the length (i.e., Z direction) of the fibers 20. The second cable 50 has a connector 54 at the other end in the Z direction. The connector 52 provided at the one end of the second cable 50 can be coupled to a connector 44 of the first cable 40. The connector 54 provided at the other end of the second cable 50 can be coupled to a connector 68 of the case 60. With these connectors, it is easy to assemble or disassemble the photoelectric encoder 100. Thus, it is possible to further improve easiness in handling, usability, and work efficiency.

As explained above, in a photoelectric encoder according to the present embodiment of the invention, the plurality of fibers 20 is partially disposed inside the jacket of the first cable 40 in such a manner that the positions of the fibers 20 are fixed relative to one another in a section taken along a plane orthogonal to the direction of the length of the fibers 20. In addition, the plurality of fibers 20 is partially disposed inside the jacket of the second cable 50 in such a manner that the positions of the fibers 20 are variable relative to one another in the section taken along the plane orthogonal to the direction of the length of the fibers 20. Since such a structure eliminates need for fixing the fibers 20 for a long distance, which is cumbersome, it is possible to assemble the photoelectric encoder easily. In addition, with such a structure, it is easier to configure a system for long distance optical transmission through the fibers 20. Moreover, since the plurality of fibers 20 is partially disposed inside the jacket of the second cable 50, which is relatively near the case 60, in such a manner that the positions of the fibers 20 are variable relative to one another in the section taken along the orthogonal plane, it is easier to optically connect the fibers 20 to the light source 62 and the light-sensitive element 64, which are provided inside the case 60. Furthermore, since the plurality of fibers 20 is partially disposed inside the jacket of the second cable 50, which is provided outside the case 60, in such a manner that the positions of the fibers 20 are variable relative to one another in the section taken along the orthogonal plane, it is not necessary to provide components that are used for unbundling the bundle fiber 26 inside the case 60. Thus, the size of the case 60 can be reduced.

Next, with reference to FIG. 6, a photoelectric encoder according to a variation example of the foregoing embodiment of the invention is explained below. In the following description of a variation example, the same reference numerals are used for components that are the same as those of the foregoing embodiment of the invention to simplify or omit explanation. The same applies for other variation examples.

A photoelectric encoder according to the present variation example includes a plurality of pieces of a second cable. Each of the plural pieces of the second cable has a first connector and a second connector. The first connector of one piece of the second cable can be coupled to the second connector of another piece of the second cable. The plural pieces of the second cable are connected in series by means of the coupling of the first and second connectors.

Figure 6:
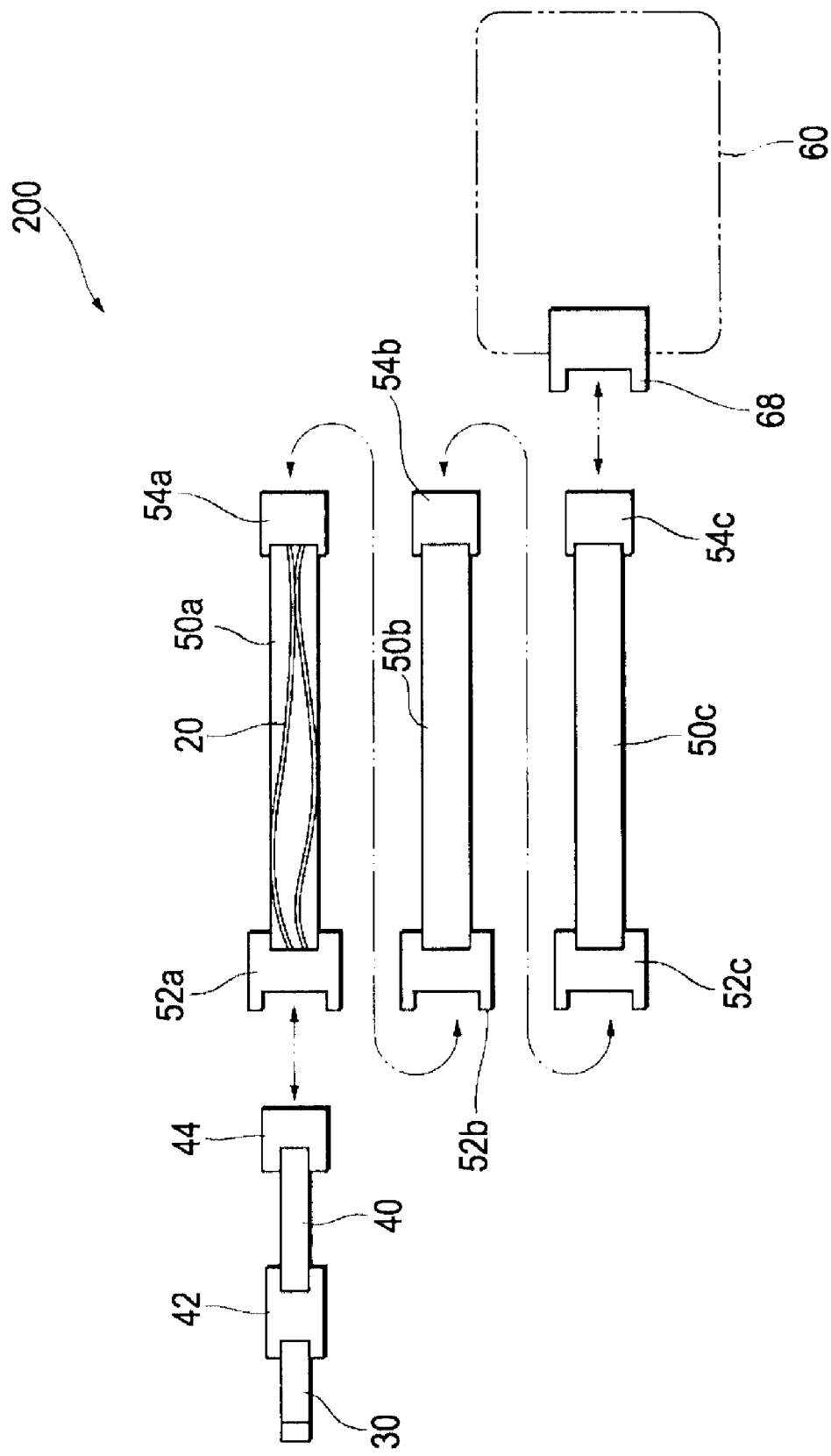
FIG. 6 is a diagram that schematically illustrates an example of the configuration of a photoelectric encoder according to a variation example of the embodiment of the invention.

As illustrated in FIG. 6, a photoelectric encoder 200 includes three pieces of a second cable, which may be hereinafter referred to as second cable 50a, second cable 50b, and second cable 50c. The structure of each of the second cables 50a, 50b, and 50c is the same as that of the second cable 50 explained in the foregoing embodiment. With such serial connection of the second cables 50a, 50b, and 50c, is possible to configure a system for long distance optical transmission through the fibers 20 between the detection head 30 and the case 60 more easily.

The second cable 50a is optically connected to the second cable 50b. The second cable 50b is optically connected to the second cable 50c. Each of the second cables 50a, 50b, and 50c has a connector at one end and another connector at the other end. The type of the connector provided at the one end is different from the type of the connector provided at the other end. Accordingly, the type of a connector of one cable that can be coupled to a connector of another cable is different from the type of the connector of said another cable. For example, each of the second cables 50a, 50b, and 50c has a male connector at one end and a female connector at the other end. With such a structure, it is possible to increase or decrease the entire length of the second cable, that is, the entire length of assembled pieces, easily by increasing or decreasing the number of pieces of the second cable that are connected in series.

The following is a more specific example of the structure of a photoelectric encoder according to the present variation example. The second cable 50a has a connector 52a at one end and a connector 54a at the other end. The connector 52a of the second cable 50a can be coupled to the connector 44 of the first cable 40. The connector 54a of the second cable 50a can be coupled to a connector 52b of the second cable 50b. The second cable 50b has the connector 52b at one end and a connector 54b at the other end. As described above, the connector 52b of the second cable 50b can be coupled to the connector 54a of the second cable 50a. The connector 54b of the second cable 50b can be coupled to a connector 52c of the second cable 50c. The second cable 50c has the connector 52c at one end and a connector 54c at the other end. As described above, the connector 52c of the second cable 50c can be coupled to the connector 54b of the second cable 50b. The connector 54c of the second cable 50c can be coupled to the connector 68 of the case 60. These connectors can be coupled by mechanically or optically connecting the fibers 20.

As explained above, in the present variation example, the plural pieces of the second cable are connected in series. Since a photoelectric encoder according to the present variation example has such a structure, it is possible to adjust the length of the fibers 20 freely between the detection head 30 and the case 60. Thus, it is possible to further improve easiness in handling, usability, and work efficiency.

Next, with reference to FIG. 7, a photoelectric encoder according to another variation example of the foregoing embodiment of the invention is explained below.

A photoelectric encoder according to the present variation example further includes a third cable and a fourth cable, both of which are provided between a second cable and a case. A light emission fiber(s) is disposed inside the jacket of the third cable. A plurality of light reception fibers is disposed inside the jacket of the fourth cable.

Figure 7:
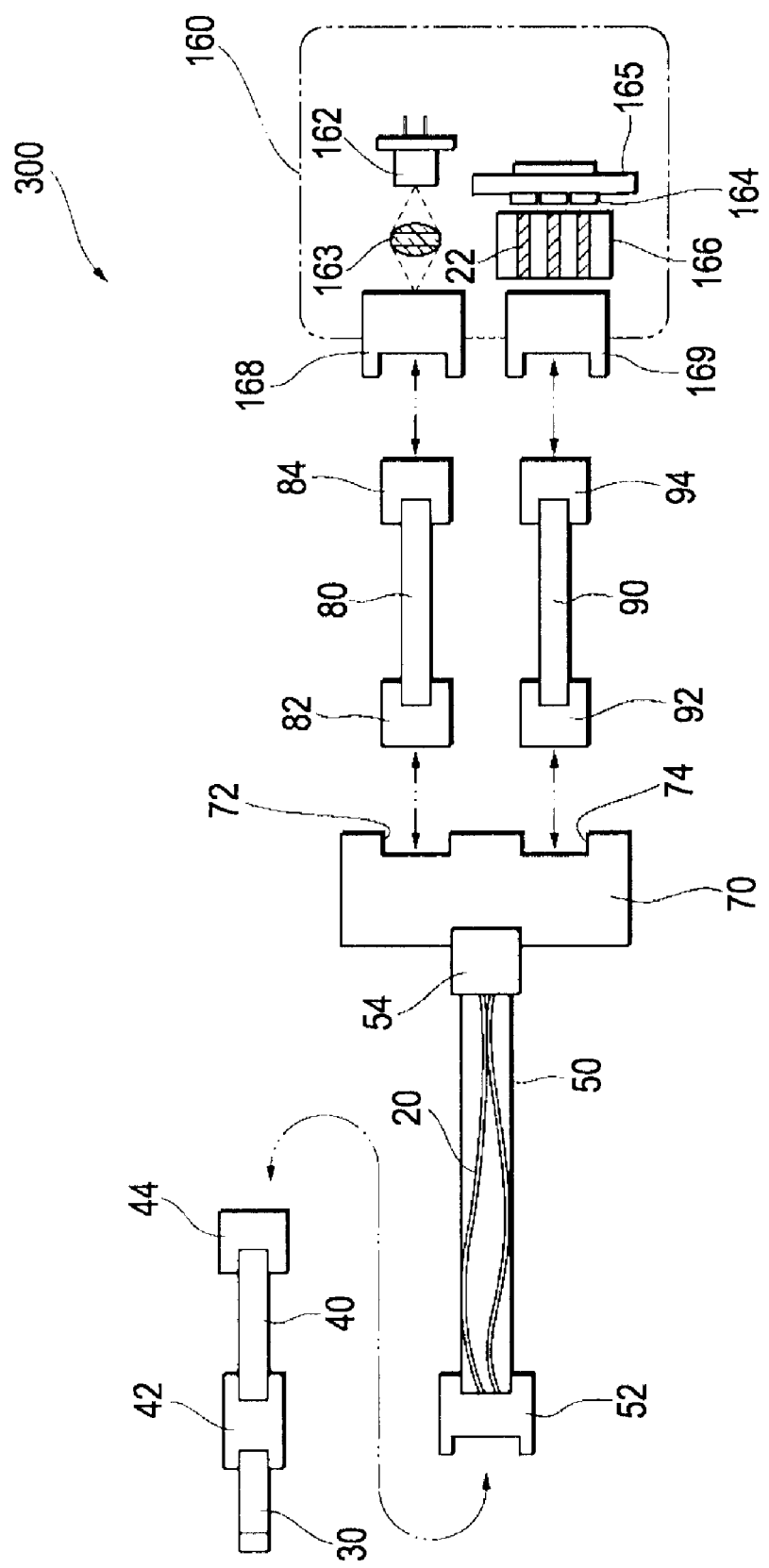
FIG. 7 is a diagram that schematically illustrates an example of the configuration of a photoelectric encoder according to a variation example of the embodiment of the invention.

As illustrated in FIG. 7, a photoelectric encoder 300 includes a third cable 80 and a fourth cable 90. The plurality of fibers 20 extending from (and through) the second cable 50 is partially disposed inside the jackets of the third cable 80 and the fourth cable 90 separately. Specifically, among the plurality of fibers 20, a light emission fiber is disposed inside the jacket of the third cable 80. A plurality of light reception fibers is disposed inside the jacket of the fourth cable 90.

A splitter 70, which functions to branch the plurality of fibers 20, is connected to the connector 54 of the second cable 50. The splitter 70 has connector parts 72 and 74. The connector part 72 can be coupled to a connector 82 of the third cable 80. The connector part 74 can be coupled to a connector 92 of the fourth cable 90. The third cable 80 has the connector 82, which can be coupled to the connector part 72, at one end. In addition, the third cable 80 has a connector 84 at the other end. The connector 84 can be coupled to a connector 168 of a case 160. The fourth cable 90 has the connector 92, which can be coupled to the connector part 74, at one end. In addition, the fourth cable 90 has a connector 94 at the other end. The connector 94 can be coupled to a connector 169 of the case 160.

In the variation example described herein, the splitter 70 is configured as a discrete unit that is not a part of the second cable 50. However, the splitter 70 may be configured as a part of the second cable 50. That is, the connector 54 and the splitter 70 may be configured as a part of the second cable 50 at the end opposite to the first-cable-side (40) end.

A light source 162 is provided inside the case 160 at a position corresponding to the connector 168, which is provided for the light emission fiber. A light-sensitive element 164 is provided inside the case 160 at a position corresponding to the connector 169, which is provided for the plurality of light reception fibers. The light-sensitive element 164 is mounted on a substrate 165. A lens 163 may be interposed between the light source 162 and the connector 168. In the illustrated configuration, light emitted from the light source 162 passes through the lens 163 to enter the connector 168. The light propagates through the light emission fiber. A block 166 may be interposed between the connector 169 and the light-sensitive element 164. In the illustrated configuration, reflected light, which comes from the scale 10 and propagates through each of the light reception fibers, passes through the block 166 to be received by the light-sensitive element 164.

The plurality of fibers may be partially disposed inside the jacket of the fourth cable 90 (the third cable 80) in such a manner that the positions of the fibers are fixed relative to one another in a section taken along a plane orthogonal to the direction of the length of the fibers. Alternatively, the plurality of fibers may be partially disposed inside the jacket of the fourth cable 90 in such a manner that the positions of the fibers are variable relative to one another in the section taken along the orthogonal plane.

As explained above, a photoelectric encoder according to the present variation example includes the third cable and the fourth cable, both of which are provided between the second cable and the case. The light emission fiber is disposed inside the jacket of the third cable. The plurality of light reception fibers is disposed inside the jacket of the fourth cable. With such a structure, it is possible to further reduce the size of the photoelectric encoder.

Next, with reference to FIGS. 8 and 9, a photoelectric encoder according to still another variation example of the foregoing embodiment of the invention is explained below. In the present variation example, modes of measurement carried out by using the photoelectric encoder described above are explained.

In an example of modes that is shown in FIG. 8, the detection head 30 is oriented toward the scale 10. The optical surface 32 of the detection head 30, which functions as a light emission plane or a light reception plane, is parallel to the surface of the scale 10 that is defined by the X direction (i.e., measurement axis direction) and the Y direction. That is, the optical surface 32 is parallel to the X-Y plane. This means that the direction of the length (i.e., Z direction) of fibers is perpendicular to the surface of the scale 10. A detection head holding mechanism 132 holds the detection head 30. When driven by an actuator that not illustrated in the drawing, the detection head 30 moves in the X direction.

As described above, in the illustrated example of FIG. 8 in which the detection head 30 is oriented toward the scale 10, the direction of the length of fibers is perpendicular to the surface of the scale 10. In such a mode, even in a case where there is a limited space in the direction perpendicular to the surface of the scale 10, a photoelectric encoder can overcome the space constraint because of the flexibility of the fibers extending from the detection head 30 at a space inside the second cable 50. Thus, the photoelectric encoder can carry out measurement with spatial efficiency.

Another example of modes is explained below. In an example shown in FIG. 9, the detection head 30 is oriented with respect to the scale 10 in such a manner that the optical surface 32 of the detection head 30, which functions as a light emission plane or a light reception plane, is perpendicular to the surface of the scale 10 that is defined by the X direction (i.e., measurement axis direction) and the Y direction. That is, the optical surface 32 is perpendicular to the X-Y plane. This means that the direction of the length (i.e., Y direction) of fibers is parallel to the surface of the scale 10. A detection head holding mechanism 134 holds the detection head 30. When driven by an actuator that is not illustrated in the drawing, the detection head 30 moves in the X direction.

As illustrated in FIG. 9, a photoelectric encoder 400 further includes an optical element 136. The optical element 136 refracts light emitted from the detection head 30 to change its direction. The refracted light is irradiated on the scale 10. In addition, the optical element 136 refracts light reflected by the scale 10 to change its direction. The position of the optical element 136 relative to the position of the surface 32 of the detection head 30 is fixed. For example, the optical element 136 may be fixed to the detection head holding mechanism 134 to ensure that the position of the optical element 136 is fixed relative to the position of the surface 32 of the detection head 30. As illustrated in FIG. 9, the optical element 136 may reflect light at a right angle. That is, the optical element 136 may reflect Y-directional light emitted from the surface 32 of the detection head 30 into Z-directional light, which is irradiated on the scale 10. The optical element 136 may reflect Z-directional reflected light from the scale 10 into Y-directional light, which enters the surface 32 of the detection head 30. A reflecting mirror may be used as the optical element 136. Another example of the optical element 136 is a prism such as a reflecting right-angle prism.

Since a photoelectric encoder according to the above mode of the present variation example is provided with the optical element 136 whose position is fixed relative to the position of the surface 32 of the detection head 30, it is possible to orient the detection head 30 with respect to the scale 10 in such a manner that the surface 32 functioning as a light emission plane or a light reception plane is, for example, perpendicular to the surface of the scale 10. That is, it is not always necessary that the surface 32 be parallel to the surface of the scale 10. With a variety of modes, it is possible to further improve easiness in handling, usability, and work efficiency.

Specific examples and applications explained in the foregoing embodiment of the invention, including but not limited to its variation examples, may be combined with each other or one another and/or modified, changed, adapted, altered, or improved as may be necessary to make them suitable for their particular use. The scope of the invention is not limited to an exemplary embodiment described herein. From the recitation of the appended claims, it is clear that the scope of the invention encompasses such a combination, a modification, an improvement, or the like. Furthermore, to the extent that the terms "contain," "include," "have," and "involve" are used in either the detailed description or the claims, such terms are intended to be inclusive in a manner similar to the term "comprising" as "comprising" is interpreted when employed as a transitional word in a claim.

What is claimed is:

1. A photoelectric encoder comprising:
    a scale that has a diffraction grating formed at a predetermined pitch in a measurement axis direction;
    a detection head that irradiates the scale with light and receives light reflected by the scale, the detection head comprising a cylindrical ferrule;
    a plurality of fibers through which the light that is to be irradiated on the scale and the light reflected by the scale propagates;
    a first cable that has an inner space in which the plurality of fibers is partially disposed;
    a second cable that has an inner space in which the plurality of fibers is partially disposed;
    a coupling part disposed between the detection head and the first cable and connecting the detection head and the first cable; and
    a frame unit inside which a light source and a light-sensitive element are provided, the light source supplying light to the plurality of fibers or at least one of the plurality of fibers, the light-sensitive element receiving the reflected light propagating through the plurality of fibers or the others of the plurality of fibers and converting the received light into an electric signal,
    wherein the first cable, the second cable, and the frame unit are disposed in this order in a direction of propagation of the light reflected by the scale through the plurality of fibers or the others of the plurality of fibers,
    the plurality of fibers is partially disposed in the inner space of the first cable in such a manner that the positions of the fibers are fixed relative to one another in a direction orthogonal to a direction of length of the fibers,
    the plurality of fibers is partially disposed in the inner space of the second cable in such a manner that the positions of the fibers are variable relative to one another in the direction orthogonal to the direction of the length of the fibers,
    an inside diameter of the second cable is larger than an inside diameter of the first cable, and
    the second cable is more flexible than the first cable.

2. The photoelectric encoder according to claim 1, wherein the plurality of fibers is partially disposed in the inner space of the second cable in such a manner that positions of the fibers are random relative to one another in the direction orthogonal to the direction of the length of the fibers.

3. The photoelectric encoder according to claim 1, wherein the plurality of fibers is partially disposed in the inner space of the second cable in such a manner that each of the fibers has slack.

4. The photoelectric encoder according to claim 1, wherein the plurality of fibers is partially disposed in the inner space of the first cable in such a manner that each two of the fibers one of which is disposed adjacent to the other in the direction orthogonal to the direction of the length of the fibers are in contact with each other.

5. The photoelectric encoder according to claim 1, wherein the second cable has a first connector provided at one end in the direction of the length of the fibers and a second connector provided at the other end in the direction of the length of the fibers.

6. The photoelectric encoder according to claim 5, wherein the first cable has a connector that can be coupled to the first connector; and the frame unit has a connector that can be coupled to the second connector.

7. The photoelectric encoder according to claim 5, wherein the second cable comprises a plurality of cable pieces; each of the cable pieces has the first connector and the second connector; the first connector can be coupled to the second connector; and the first connector of one cable piece of the second cable is coupled to the second connector of another cable piece of the second cable.

8. The photoelectric encoder according to claim 1, wherein the plurality of fibers comprises a light emission fiber through which the light that is to be irradiated on the scale propagates and a plurality of light reception fibers through which the light reflected by the scale propagates.

9. The photoelectric encoder according to claim 8 further comprising:
    a third cable that is provided between the second cable and the frame unit and has an inner space in which the light emission fiber is disposed, one end of the third cable being connected to the second cable and the other end of the third cable being connected to the frame unit; and
    a fourth cable that is provided between the second cable and the frame unit and has an inner space in which the plurality of light reception fibers is disposed, one end of the fourth cable being connected to the second cable and the other end of the fourth cable being connected to the frame unit.

10. The photoelectric encoder according to claim 1 further comprising:
    an optical element that changes a direction of the light that is emitted from the detection head for irradiation on the scale and changes a direction of the light reflected by the scale, wherein a position of the optical element relative to a position of the detection head is fixed.

11. The photoelectric encoder according to claim 8 further comprising:
a third cable that is provided between the second cable and the frame unit and has an inner space in which the light emission fiber is disposed, one end of the third cable being in contact with the second cable and the other end of the third cable being in contact with the frame unit; and
a fourth cable that is provided between the second cable and the frame unit and has an inner space in which the plurality of light reception fibers is disposed, one end of the fourth cable being in contact with the second cable and the other end of the fourth cable being in contact with the frame unit.

12. A photoelectric encoder comprising:
a scale that has a diffraction grating formed at a predetermined pitch in a measurement axis direction;
a detection head comprising a cylindrical ferrule that irradiates the scale with light and receives light reflected by the scale;
a plurality of fibers through which the light that is to be irradiated on the scale and the light reflected by the scale propagates;
a first cable in which the plurality of fibers is disposed;
a second cable in which the plurality of fibers is disposed;
a coupling part disposed between the detection head and the first cable and connecting the cylindrical ferrule of the detection head to the first cable; and
a frame unit inside which a light source and a light-sensitive element are provided, the light source supplying light to the plurality of fibers or at least one of the plurality of fibers, the light-sensitive element receiving the reflected light propagating through the plurality of fibers or the others of the plurality of fibers and converting the received light into an electric signal,
wherein the detection head, the first cable, the second cable, and the frame unit are disposed in this order in a direction of propagation of the light reflected by the scale through the plurality of fibers or the others of the plurality of fibers,
the plurality of fibers is partially disposed in the inner space of the first cable in such a manner that the positions of the fibers are fixed relative to one another in a direction orthogonal to a direction of length of the fibers,
the plurality of fibers is partially disposed in the inner space of the second cable in such a manner that the positions of the fibers are variable relative to one another in the direction orthogonal to the direction of the length of the fibers,
an inside diameter of the second cable is larger than an inside diameter of the first cable, and
the second cable is more flexible than the first cable.

13. The photoelectric encoder according to claim 12 further comprising:
a third cable that is provided between the second cable and the frame unit and has an inner space in which a light emission fiber through which the light that is to be irradiated on the scale propagates is disposed, one end of the third cable being connected to the second cable and the other end of the third cable being connected to the frame unit; and
a fourth cable that is provided between the second cable and the frame unit and has an inner space in which a plurality of light reception fibers through which the light reflected by the scale propagates is disposed, one end of the fourth cable being connected to the second cable and the other end of the fourth cable being connected to the frame unit.

14. The photoelectric encoder according to claim 12 further comprising:
a third cable that is provided between the second cable and the frame unit and has an inner space in which a light emission fiber through which the light that is to be irradiated on the scale propagates is disposed, one end of the third cable being in contact with the second cable and the other end of the third cable being in contact with the frame unit; and
a fourth cable that is provided between the second cable and the frame unit and has an inner space in which a plurality of light reception fibers through which the light reflected by the scale propagates is disposed, one end of the fourth cable being in contact with the second cable and the other end of the fourth cable being in contact with the frame unit.

* * * * *